(12) United States Patent
Koga

(10) Patent No.: US 9,443,122 B2
(45) Date of Patent: Sep. 13, 2016

(54) UPLOAD APPARATUS, SERVER APPARATUS, UPLOAD SYSTEM, AND UPLOAD METHOD

(75) Inventor: Tadaharu Koga, Kanagawa (JP)

(73) Assignee: Sony Corporation, Tokyo (JP)

( * ) Notice: Subject to any disclaimer, the term of this patent is extended or adjusted under 35 U.S.C. 154(b) by 1244 days.

(21) Appl. No.: 12/454,630

(22) Filed: May 20, 2009

(65) Prior Publication Data

US 2009/0293110 A1 Nov. 26, 2009

(30) Foreign Application Priority Data

May 22, 2008 (JP) ................................ P2008-133831

(51) Int. Cl.
G06F 15/16 (2006.01)
G06K 7/10 (2006.01)
G06F 21/36 (2013.01)
G09C 5/00 (2006.01)

(52) U.S. Cl.
CPC ............ *G06K 7/1095* (2013.01); *G06F 21/36* (2013.01); *G09C 5/00* (2013.01)

(58) Field of Classification Search
CPC ..................................................... G06F 21/36
USPC ............................................................ 726/6
See application file for complete search history.

(56) References Cited

U.S. PATENT DOCUMENTS

| 7,306,153 | B2* | 12/2007 | Chong et al. ............ 235/462.15 |
| 7,739,190 | B2* | 6/2010 | Shin et al. ..................... 705/39 |
| 7,809,407 | B2* | 10/2010 | Oshima et al. ............... 455/566 |
| 8,144,893 | B2* | 3/2012 | Sherman ......................... 381/77 |
| 2005/0162699 | A1* | 7/2005 | Fukunaga et al. ............ 358/1.18 |
| 2006/0000910 | A1* | 1/2006 | Chong et al. ............. 235/462.15 |
| 2006/0218627 | A1* | 9/2006 | Komatsu ........................... 726/5 |
| 2008/0231716 | A1* | 9/2008 | Anderson .................. 348/211.3 |
| 2009/0271872 | A1* | 10/2009 | Ishizuka et al. ................ 726/28 |

FOREIGN PATENT DOCUMENTS

| JP | 2003-122911 A | 4/2003 |
| JP | 2003-256640 A | 9/2003 |
| JP | 2005-258688 A | 9/2005 |
| JP | 2007-249929 A | 9/2007 |
| JP | 2008-108027 A | 5/2008 |

* cited by examiner

*Primary Examiner* — Esther B Henderson
(74) *Attorney, Agent, or Firm* — Chip Law Group

(57) ABSTRACT

An upload apparatus includes: an outputter configured to output a code image including information of an ID and a password necessary for uploading content onto a network; and an uploader configured to upload the content onto said network by use of said code image outputted by the outputter.

10 Claims, 10 Drawing Sheets

UPLOAD APPARATUS, SERVER APPARATUS, UPLOAD SYSTEM, AND UPLOAD METHOD

BACKGROUND OF THE INVENTION

1. Field of the Invention

The present application claims priority from Japanese Patent Application No. JP 2008-133831 filed in the Japanese Patent Office on May 22, 2008, the entire content of which is incorporated herein by reference.

The present invention relates to an upload apparatus, a server apparatus, an upload system, and an upload method that are configured to upload content on networks.

2. Description of the Related Art

Recently, such network services based on image posting management systems and so on as blogs (Weblogs), SNS (Social Network Services), and moving image sharing services, for example, have been increasing.

Users of these services can upload images on networks.

In using these services, users can two-dimensionally encode these necessary URL (Uniform Resource Locator) information to easily execute a URL input operation and an operation of transmitting URL information to other users at the terminals of users (refer to Japanese Patent Laid-open No. 2007-249929, for example).

It should be note here that these services are basically operated by membership systems, so that each user must get registered as a member in advance and log in on a server providing an image posting management system and the like in many cases (refer to Japanese Patent Laid-open No. 2008-108027, for example).

The member registration is executed by accessing from a network-connectable user terminal to a server providing an image posting management system and the like to receive an ID and a password necessary for login from that server.

A login operation is executed by the user's entry of the ID and the password distributed at the time of the membership registration into the user terminal and transmitting the ID and the password to the server providing the image posting management system. If the user stores the ID and the password in the user terminal beforehand, the user can execute a login operation with ease.

SUMMARY OF THE INVENTION

However, if the user has not stored the ID and the password in the user terminal to be used or if two or more users share one user terminal, the user or users must execute a cumbersome operation of entering each user's ID and password.

Therefore, the present invention addresses the above-identified and other problems associated with related-art methods and apparatuses and solves the addressed problems by providing an upload apparatus, a server apparatus, an upload system, and an upload method that are high in usability and configured to allow users to log in on a content sharing service providing server apparatus with an easy method, thereby uploading content.

In carrying out the invention and according to one embodiment thereof, there is provided an upload apparatus. This upload apparatus has output means for outputting a code image including information of an ID and a password necessary for uploading content onto a network, and upload means for uploading the content onto the network by use of the code image outputted by the output means.

Because the upload apparatus outputs a code image including information of an ID and a password, this information can be extracted from the code image and the extracted information can be transmitted to the network, for example. Consequently, by a simple method, the user can log in on a server apparatus providing content sharing services without entering his or her ID and password, thereby uploading content. If there are more than one user, one information processing apparatus included in the upload apparatus to be shared by more than one user extracts the information of the ID and the password for each user and the extracted information is transmitted to the network.

In the above-mentioned upload apparatus, the upload means has storage means for storing the content and the outputted code image by relating each other, extraction means for extracting the information of the ID and the password from the stored code image, and transmission means for transmitting the content and information of an ID and a password extracted from the code image corresponding to the content to a server apparatus on the network, the server apparatus being logged in by use of the ID and the password.

The upload apparatus stores the content and the code image including the information of the ID and the password by relating the content with the code image. Consequently, by user's selecting content to be uploaded, the above-mentioned code image is specified. In addition, the upload apparatus extracts the information of the ID and the password from the above-mentioned specified code image and transmits the content selected by the user and the extracted information to the server apparatus. Namely, by user's selecting desired content to be uploaded on the network, the content and the information of the ID and the password necessary for the uploading are transmitted to the server apparatus. Consequently, the user can upload, in a simple method, desired content by logging in on the server apparatus that provides content sharing services.

In the above-mentioned upload apparatus, the output means outputs the code image including the ID, the password, and address information of the server apparatus. The storage means stores the content and the code image including the address information by relating each other. The extraction means extracts the ID, the password, and the address information from the stored code image. The transmission means transmits the content and information of an ID and a password extracted from the code image corresponding to the content to the server apparatus by use of the address information.

The upload means transmits the content and the information of the ID and the password to the server apparatus by use of the address information of the server apparatus included in the code image. Consequently, the user can upload, in a simple method, the content without entering the address information of the server apparatus.

In the above-mentioned upload apparatus, the output means has a display configured to display the code image. The upload means is a camera device having image capturing means for taking the code image displayed on the display, storage means for storing the content and the taken code image by relating each other, extraction means for extracting the information of the ID and the password from the stored code image, and transmission means for transmitting the content and information of an ID and a password extracted from the code image corresponding to the content to a server apparatus on the network, the server apparatus being logged in by use of the ID and the password.

The upload apparatus has a display configured to display the above-mentioned code image. The camera device that provides the upload means has the image capturing means, the storage means, the extraction means, and the transmission means. This configuration allows the user to upload content in a simple method by taking, through the above-mentioned camera device, a code image displayed on the above-mentioned display.

In the above-mentioned upload apparatus, the output means has a display configured to display the code image. The upload means has: a camera device configured to take a code image displayed on the display; and an information processing apparatus having means for downloading the code image from the camera device to store the content and the downloaded code image by relating each other, means for extracting the information of the ID and the password from the stored code image, and means for transmitting the content and information of an ID and a password extracted from the code image corresponding to the content to a server apparatus on the network, the server apparatus being logged in by use of the ID and the password.

The information processing apparatus included in the upload means downloads the above-mentioned code image from the above-mentioned camera device, relates the content with the downloaded code image, and stores the related content and code image. Also, the information processing apparatus extracts the above-mentioned information from the stored code image and transmits the above-mentioned content and the extracted information to the server apparatus. This configuration allows the user to easily upload content by connecting the camera device with the information processing apparatus such that the code image displayed on the above-mentioned display is taken by the camera device and the above-mentioned downloading is enabled.

In the above-mentioned upload apparatus, the output means has a display configured to display the code image. The upload means has: a camera device configured to take a code image displayed on the display; an information processing apparatus configured to download the code image from the camera device, relate the content with the downloaded code image, and transmit the content and the code image to the network; and a primary server apparatus having means for receiving the content and the code image, means for extracting the information of the ID and the password from the received code image, and means for transmitting the content and information of an ID and a password extracted from the code image corresponding to the content to a server apparatus on the network, the server apparatus being logged in by use of the ID and the password. The primary server apparatus included in the upload apparatus receives the content and the code image from the information processing apparatus, extracts the information from the received code image, and transmits the content and the extracted information to the server apparatus. This configuration allows the user to easily upload content by transmitting the content and the code image to the primary server apparatus even if the information processing apparatus does not include means for extracting the information.

In the above-mentioned upload apparatus, the output means prints the code image on print media. The upload means has: a camera device configured to take an image including the print media to create image content data as data of the content; and an information processing apparatus having means for downloading the created image content data to detect the printed code image from the downloaded image content data, means for extracting the information of the ID and the password from the detected code image, and means for transmitting the created image content data and information of an ID and a password extracted from the code image to a server apparatus on the network, the server apparatus being logged in by use of the ID and the password.

The camera device included in the upload means creates image content data by taking an image that includes print media printed with a code image. The information processing apparatus included in the upload means downloads the above-mentioned image content data, detects a printed image code from the image content data, and extracts the above-mentioned information from the image data. Also, the information processing apparatus transmits the above-mentioned image content data and the extracted information to the server apparatus. This configuration allows the user to easily upload content by connecting the above-mentioned camera device with the above-mentioned information processing apparatus such that the above-mentioned image content data is created by use of the camera device to enable the above-mentioned downloading.

In carrying out the invention and according to another embodiment thereof, there is provided a server apparatus. This server apparatus has reception means for receiving content uploaded on a network by an upload apparatus for outputting a code image including information of an ID and a password necessary for uploading the content on the network, and storage means for storing the received content.

Consequently, by identifying each user from the information included in the above-mentioned code image, the server apparatus provides content sharing services for uploading content onto a network in a simple method without entering user's ID and password.

In the above-mentioned server apparatus, the reception means receives address information from an information terminal apparatus having the address information on the network, the information terminal apparatus being connected to the network. The server apparatus further has transmission means for transmitting the code image including the ID, the password, and address information of the server apparatus on the network to the information terminal apparatus corresponding to the received address information.

For example, the server apparatus has a membership registration mail address and the user transmits an empty mail to this membership registration mail address. The server apparatus recognizes the mail address of the user from the received empty mail, and transmits the above-mentioned code image to the recognized mail address. Consequently, the user can receive the above-mentioned code image without failure. Also, the server apparatus transmits the ID and the password with the above-mentioned code image to the mail address recognized from the received empty mail. This configuration facilitates the management of code images received by the user.

In carrying out the invention and according to still another embodiment thereof, there is provided an upload system. This upload system has output means for outputting a code image including information of an ID and a password necessary for uploading content onto a network, an upload apparatus having upload means for uploading the content onto the network by use of a code image outputted from the output means, reception means for receiving the content uploaded by the upload apparatus, and a server apparatus having storage means for storing the received content.

In the above-mentioned upload system, the upload means relates the content with the outputted code image and has transmission means for transmitting the content and the code image to the network. The upload system further has a primary server apparatus having means for receiving the content and the code image, means for extracting the information of the ID and the password from the received code image, and means for transmitting the content and the information of the ID and the password extracted from the code image corresponding to the content to the server apparatus on the network, the server apparatus being logged in by use of the ID and the password.

In carrying out the invention and according to yet another embodiment thereof, there is provided an upload method. This upload method has the steps of: outputting, by output means of an upload apparatus, a code image including information of an ID and a password necessary for uploading content onto a network; and uploading the content onto the network through upload means of the upload apparatus by use of the outputted code image.

In the description made above, each member denoted by "means" may be realized by hardware or software or both. In the case where each "means" is realized by both hardware and software, the hardware portion at least includes a storage device configured to store a software program. The hardware is configured by the selective use of at least one of a CPU (Central Processing Unit), an MPU (Micro Processing Unit), a RAM (Random Access Memory), a ROM (Read Only Memory), a DSP (Digital Signal Processor), an FPGA (Field Programmable Gate Array), an ASIC (Application Specific Integrated Circuit), a display device, an NIC (Network Interface Card), a WNIC (Wireless NIC), a modem, an optical disk, a magnetic disk, and a flash memory.

As described above and according to embodiments of the invention, a user can upload, in a simple method, content by logging in on a server apparatus that provides content sharing services regardless whether the user stores his or her ID and password in an information processing apparatus to be used.

DETAILED DESCRIPTION OF THE PREFERRED EMBODIMENTS

This invention will be described in further detail by way of embodiments thereof with reference to the accompanying drawings.

Figure 1:
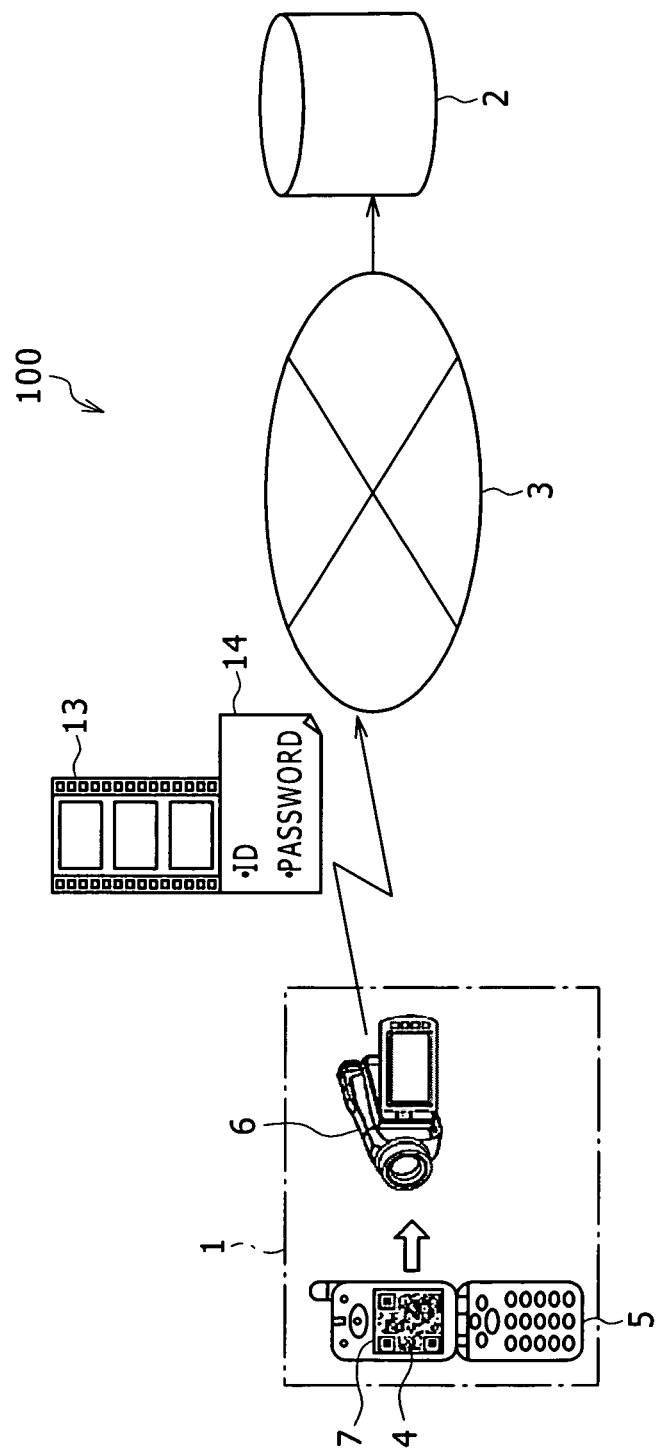
FIG. 1 is a schematic diagram illustrating a network configuration of an upload system practiced as one embodiment of the invention.

Now, referring to FIG. 1, there is shown a network configuration of an upload system practiced as one embodiment of the invention. An upload system 100 includes a server apparatus 2 connected to a network 3 and an upload apparatus 1 connectable to this network 3. The network 3 is a network based on TCP/IP (Transmission Control Protocol/Internet Protocol), for example.

The upload apparatus 1 includes a mobile phone 5 and a camera device 6. The mobile phone 5 is a device having a CPU, a RAM, a ROM, another memory, a transmitter/receiver, and so on. The memory of the mobile phone 5 stores an image indicative of a QR code 4 including information 14 of an ID and a password necessary for uploading content onto the network 3. The mobile phone 5 has a display 7 and is capable of outputting an image indicative of the QR code 4 stored in the memory onto the display 7.

Content denotes data including moving image data, still image data, audio data, and text data.

Instead of the QR code 4, a barcode, a Vericode, or the like may be used as a code image including ID and password information, for example. Also, instead of the mobile phone 5, an electronic device having a display, such as a small-size television and a digital camera, or a device with an image indicative of the QR code 4 printed on paper media, such as a visiting card, for a device for outputting an image indicative of the QR code 4, for example.

Figure 2:
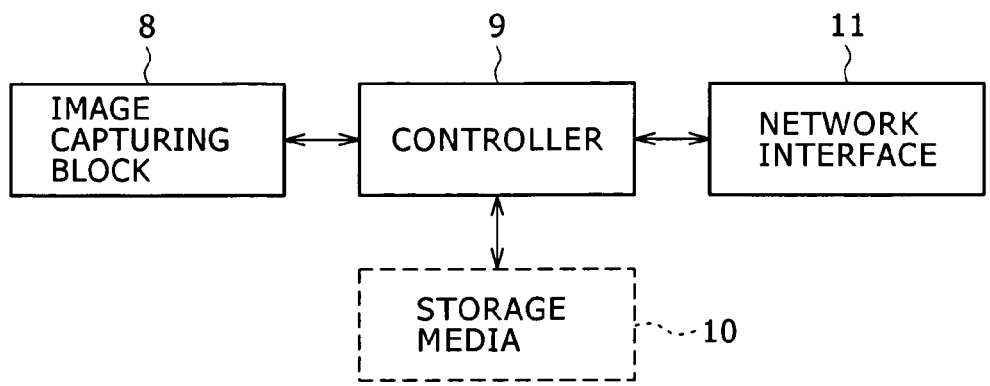
FIG. 2 is a block diagram illustrating a functional configuration of a camera device.

FIG. 2 shows a block diagram illustrating a functional configuration of the camera device 6. The camera device 6 has an image capturing block 8, a controller 9, a storage media 10, and a network interface 11. The controller 9 includes a CPU, a RAM, a ROM, and so on. The network interface 11 allows the connection to the network 3 in a wired or wireless manner by use of Ethernet (registered trademark) and other standards, for example. For the camera device 6 shown in FIG. 2, a video camcorder is used, for example. The storage media includes a hard disk drive, an optical disk, a magnetic tape, a memory card, or the like, for example.

Instead of a video camcorder, an information processing apparatus (a personal computer, for example) may be used that has image capturing capabilities, such as a camera-mounted mobile phone, and is connectable to a network.

The server apparatus 2 may be any computer apparatus as long as data can be stored, computed, received, and transmitted by this computer apparatus. The server apparatus 2 is capable of receiving content uploaded by the upload apparatus 1 and stored the received content.

The following describes operations of the upload system 100 configured as described above.

Figure 3A:
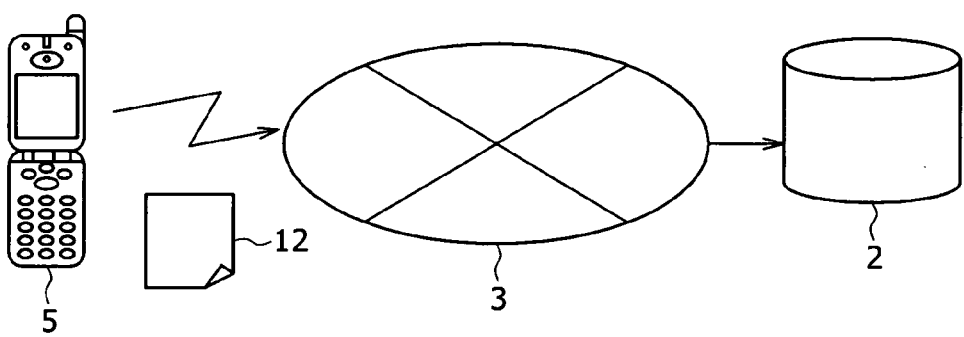
FIGS. 3A and 3B are schematic diagrams illustrating a system for membership registration.
Figure 3B:
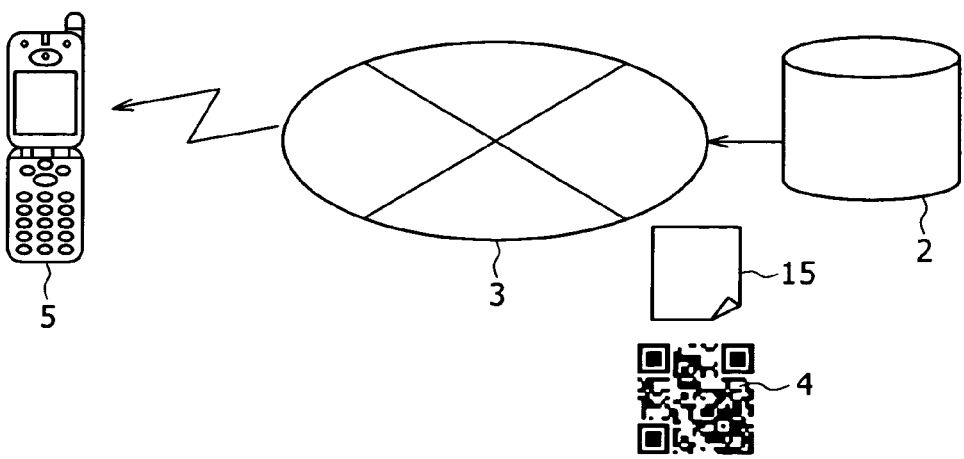
Figure 4:
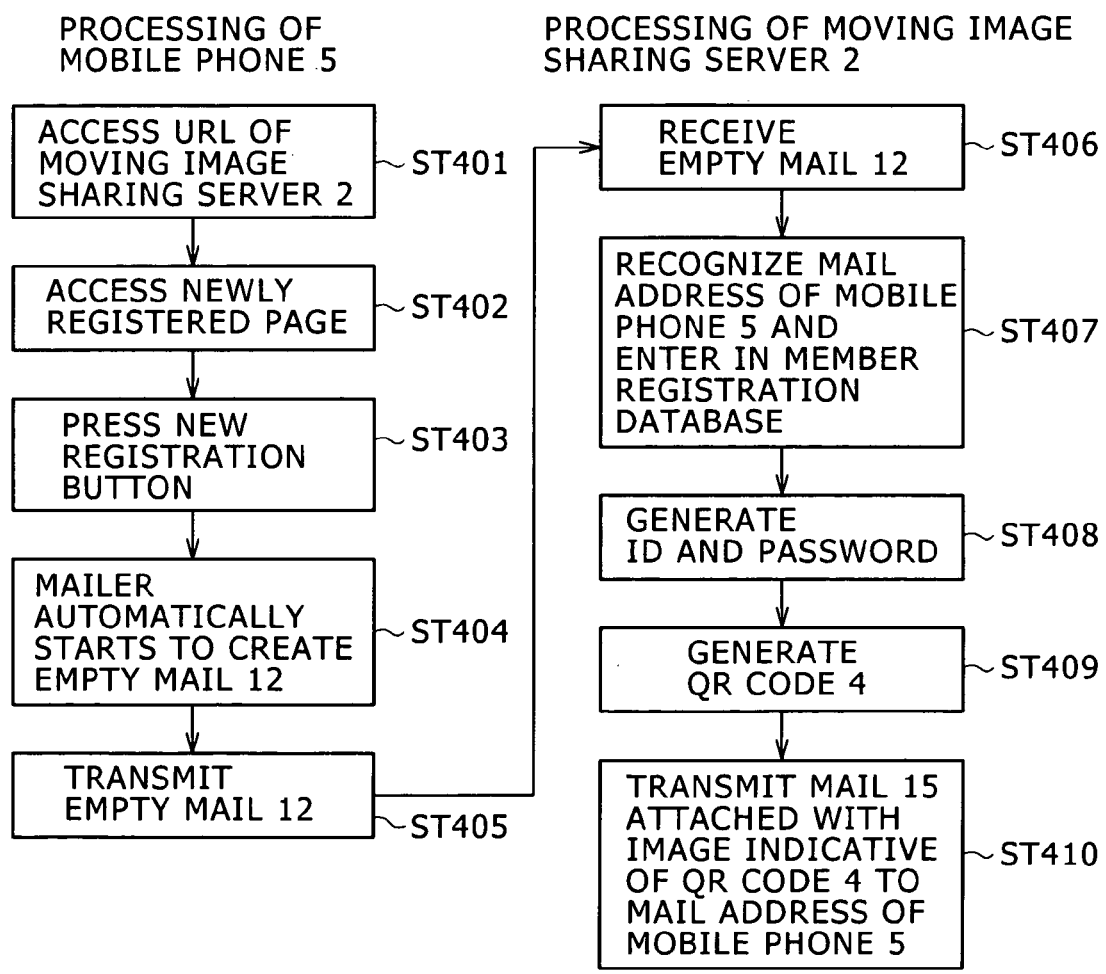
FIG. 4 is a flowchart indicative of an operation for membership registration.

First, an operation that is executed when the user executes membership registration is described. FIGS. 3A and 3B show systems for the membership registration. FIG. 4 is a flowchart indicative of this operation, in which the server apparatus 2 is a moving image sharing server 2 for providing moving image sharing services.

The user accesses the URL of the moving image sharing server 2 on the network 3 by use of the mobile phone 5 (or an information terminal apparatus) (step 401). By use of the mobile phone 5, the user accesses a new registration page of the moving image sharing server 2 (step 402). For example, the user clicks a new registration button (step 403). For example, a mailer of the mobile phone 5 is automatically activated by an application software program of the mobile phone 5. In addition, an empty mail 12 containing a membership registration mail address of the moving image sharing server 2 is created (step 404). As shown in FIG. 3A, the empty mail 12 is transmitted to the moving image sharing server 2 on the network 3 (step 405).

The moving image sharing server 2 receives the empty mail 12 transmitted from the mobile phone 5 (step 406). The moving image sharing server 2 recognizes the mail address of the mobile phone 5 from the empty mail 12 and enters the recognized mail address into the membership registration database (step 407). The moving image sharing server 2 generates an ID and a password for the user who used the mail address entered in the membership registration database to upload content to the moving image sharing server 2 (step 408). The moving image sharing server 2 generates an image indicative of the QR code 4 including the information 14 of the ID and the password generated in step 408 (step 409). As shown in FIG. 3B, the moving image sharing server 2 transmits a mail 15 attached with the image indicative of the QR code 4 generated in step 409 to the mobile phone 5 (step 410). The mobile phone 5 receives the mail 15 attached with the image indicative of the QR code 4 transmitted from the moving image sharing server 2 and stores the received image into the memory of the mobile phone 5.

Instead of the mobile phone 5, an information processing apparatus, such as a personal computer, having a mail address on the network 3 may be used. In this case, any apparatus may be used as far as such apparatus is enabled to store the image indicative of the QR code 4 into the memory of the mobile phone 5 or any apparatus that can be used for the mobile phone 5 in the upload system 100 shown in FIG. 1.

In FIG. 3B, the ID and the password may be included in the contents of the mail 15 attached with the image indicative of the QR code 4 including the information 14 of the ID and the password to be transmitted to the user from the moving image sharing server 2. Consequently, the user may store the received mail 15 to make the mail 15 and the image indicative of the QR code 4 be related with each other, thereby facilitating the management of images indicative of the QR code 4.

Figure 5:
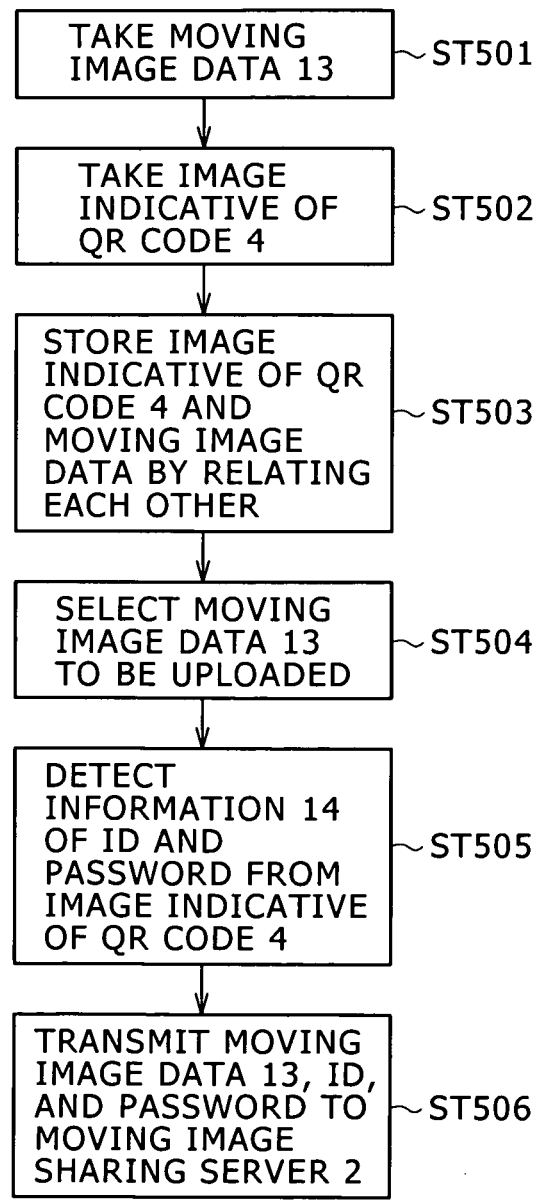
FIG. 5 is a flowchart indicative of an operation for uploading content.

The following describes an operation of the upload system 100 that is executed when content is uploaded. FIG. 5 shows a flowchart indicative of an operation to be executed on the side of the camera device 6, in which content to be uploaded is moving image data 13.

The moving image data 13 is taken by the image capturing block 8 of the camera device 6 (step 501). As shown in FIG. 1, the mobile phone 5 outputs the image indicative of the QR code 4 including the information 14 of the ID and the password stored in the memory to the display 7. For example, by use of the camera device 6, the user takes an image indicative of the outputted QR code 4 (step 502). The controller 9 of the camera device 6 relates the moving image data 13 with the image indicative of the QR code 4 and stores the data and the image into the storage media 10 (step 503). The image data 13 to be uploaded is selected by the user (step 504). The controller 9 of the camera device 6 extracts the information 14 of the ID and the password of the user from the image indicative of the QR code 4 corresponding to the selected moving image data 13 (step 505). In doing this, a known technology may be used for extracting URL information and the like for example. The controller 9 of the camera device 6 transmits the selected moving image data 13 and the extracted information 14 of the ID and the password to the moving image sharing server 2 by use of the network interface 11 (step 506). For the uploading here, API (Application Programming Interface) or the like may only be used, typically.

The moving image sharing server 2 receives the moving image data 13 and the information 14 of the ID and the password transmitted from the controller 9 of the camera device 6. The moving image sharing server 2 authenticates the received information 14 of the ID and the password and, if the user is found to be a member, permits the user to log in on the moving image sharing server 2. In this case, the moving image sharing server 2 stores the received moving image data 13 and uploads the stored moving image data 13 to the moving image sharing service with which the user has been registered as a member. For the authentication here, WSSE (Web Services Security Extensions) authentication or Basic authentication is used, for example.

As described above, in the present embodiment, the image indicative of the QR code 4 including the information 14 of the ID and the password which is outputted on the display 7 of the mobile phone 5 and necessary for uploading the moving image data 13 onto the network 3 by the user is taken by the camera device 6. In addition, the camera device 6 stores the above-mentioned moving image data 13 and the image indicative of the taken QR code 4 by relating each other, extracts the information 14 from the stored image indicative of the QR code 4, and transmits the moving image data 13 and the extracted information 14 to the moving image sharing server 2. Consequently, the user is ready for logging in on the moving image sharing server 2 by a simple method without entering the ID and the password, thereby uploading the moving image data 13.

Also, if there are more than one user, the camera device 6 takes an image indicative of the QR code 4 for each user and stores the taken image and the moving image data 13 by relating each other. In addition, the camera device 6 extracts the information 14 of the ID and the password of each of the users from the image indicative of the stored QR code 4 and transmits the extracted information 14 to the moving image sharing server 2 along with the moving image data 13. Consequently, each user is ready for sharing the camera device 6 with others.

In this case, the controller 9 of the camera device 6 can relate the taken image indicative of the QR code 4 for each of the users with any moving image data 13 stored in the camera device 6. Consequently, the user can easily upload, on the network 3, the moving image data 13 taken by other users and stored in the camera device 6.

Further, the QR code 4 may include address information, such as the IP address (URL) and so on, of the moving image sharing server 2. This allows the user to transmit the moving image data 13 and the information 14 of the ID and the password to the moving image sharing server 2 without entering the address information of the moving image sharing server 2 into the camera device 6. Namely, the user can upload the moving image data 13 by an easier method.

Figure 6:
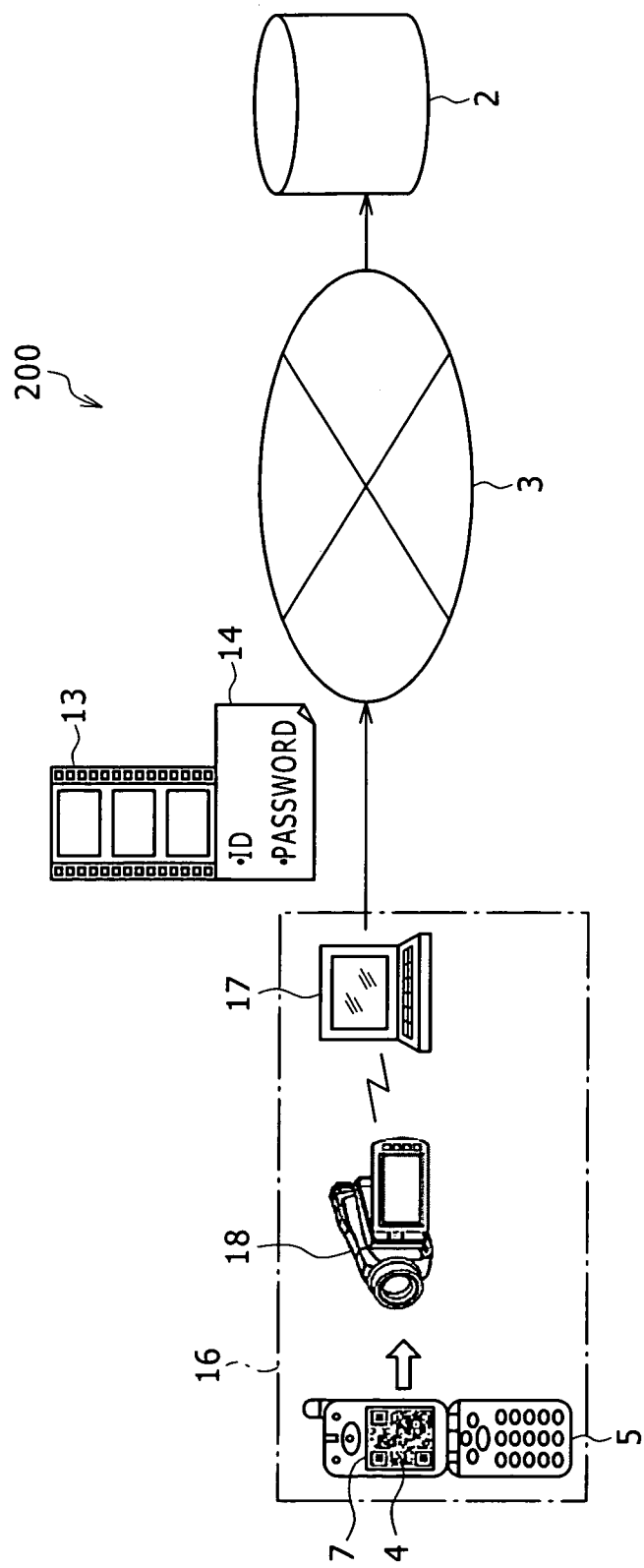
FIG. 6 is a schematic diagram illustrating a network configuration of an upload system practiced as another embodiment of the invention.

FIG. 6 shows a network configuration of an upload system 200 practiced as another embodiment of the invention. In what follows, with reference to FIG. 6, components similar to those previously described with reference to FIG. 1 showing the upload system 100 are denoted by the same reference numerals and the description of these similar components will be skipped.

The upload system 200 includes a server 2 connected to a network 3 and an upload apparatus 16 connectable thereto.

The upload apparatus 16 includes a mobile phone 5, a camera device 18, and a PC (Personal Computer) 17 as an information processing apparatus connectable to the network 3. The camera device 18 and the PC 17 are interconnected by USB (Universal Serial Bus), HDMI (High-Definition Multimedia Interface), FireWire, LAN (Local Area Network), or other interfaces, or in a wireless manner.

The camera device 18 takes an image indicative of a QR code 4 outputted on a display 7 of the mobile phone 5. The image indicative of the taken QR code 4 is downloaded by the PC. For the camera device 18, the video camcorder or the like indicated in the foregoing embodiment may be used or a video camcorder, a digital camera, or a film camera that has no network connection capabilities is available.

The information processing apparatus is not limited to the PC 17; for example, any information processing apparatus is available as long as connectable to the network 3 and capable of downloading the image indicative of the QR code 4 from the camera device 18.

The following describers operations of the upload system 200 configured as described above.

Figure 7:
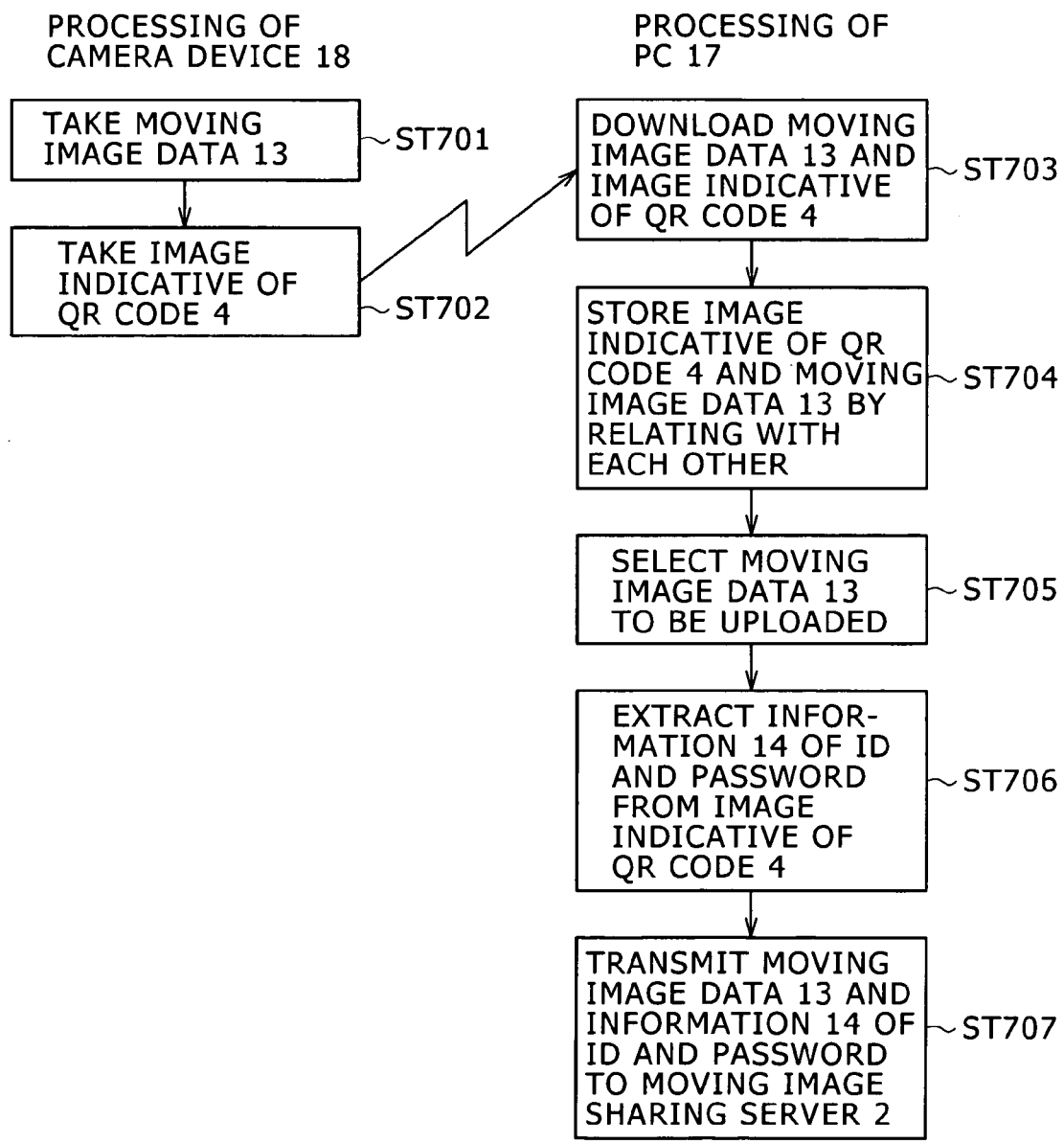
FIG. 7 is a flowchart indicative of another embodiment of an operation for uploading content.

The following describes an operation of the upload system 200 to be executed at uploading content after membership registration. A method of membership registration may be the same as that of the foregoing embodiment. FIG. 7 shows a flowchart indicative of this operation.

Substantially same operations as those of the foregoing embodiment are executed by the mobile phone 5 and the camera device 18 (step 701 and step 702). The PC 17 downloads the moving image data 13 and the image indicative of the QR code 4 from the camera device 18 (step 703). The PC 17 stores the moving image data 13 and the downloaded image indicative of the QR code 4 by relating each other (step 704). The image data 13 to be uploaded is selected by the user (step 705). The PC 17 extracts the information 14 of the ID and the password of the user from the image indicative of the QR code 4 corresponding to the selected moving image data 13 (step 706). The PC 17 transmits the selected moving image data 13 and the extracted information 14 of the ID and the password to the moving image sharing server 2 (step 707).

Consequently, by connecting the camera device 18 and the PC 17 so as to enable the above-mentioned loading, the user can upload the moving image data 13 to the moving image sharing server 2 by the simple method without entering the ID and the password.

Figure 8:
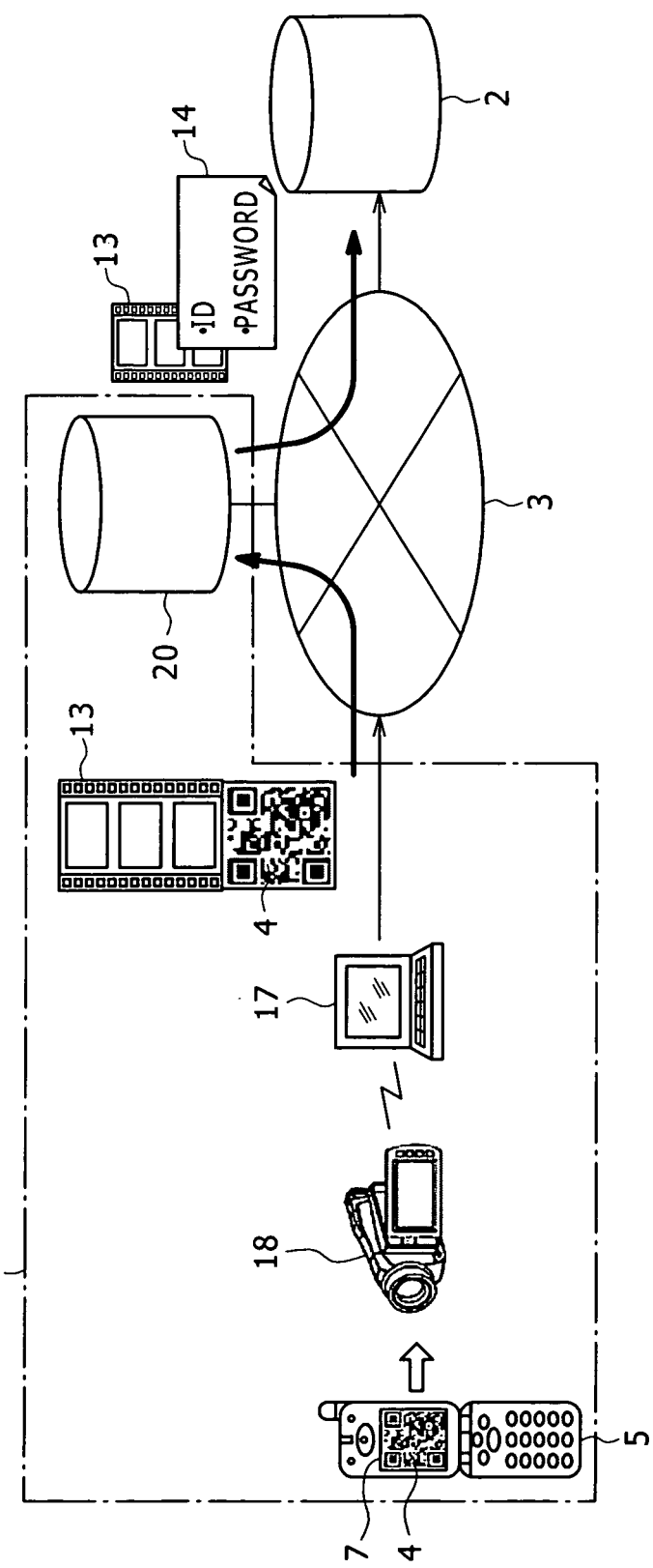
FIG. 8 is a schematic diagram illustrating a network configuration of an upload system practiced as still another embodiment of the invention.

FIG. 8 shows a network configuration of an upload system 300 practiced as still another embodiment of the invention. The upload system 300 has a moving image sharing server 2 connected to a network 3 and an upload apparatus 19 connected thereto.

The upload system 19 includes a mobile phone 5, a camera device 18, a PC 17, and a primary server apparatus 20 connected to the network 3. The primary server apparatus 20 is a computer configured to store, compute, receive and transmit data. The PC 17 is connected to the primary server apparatus 20 via the network 3.

The following describes operations of the upload system 300 configured as described above.

Figure 9:
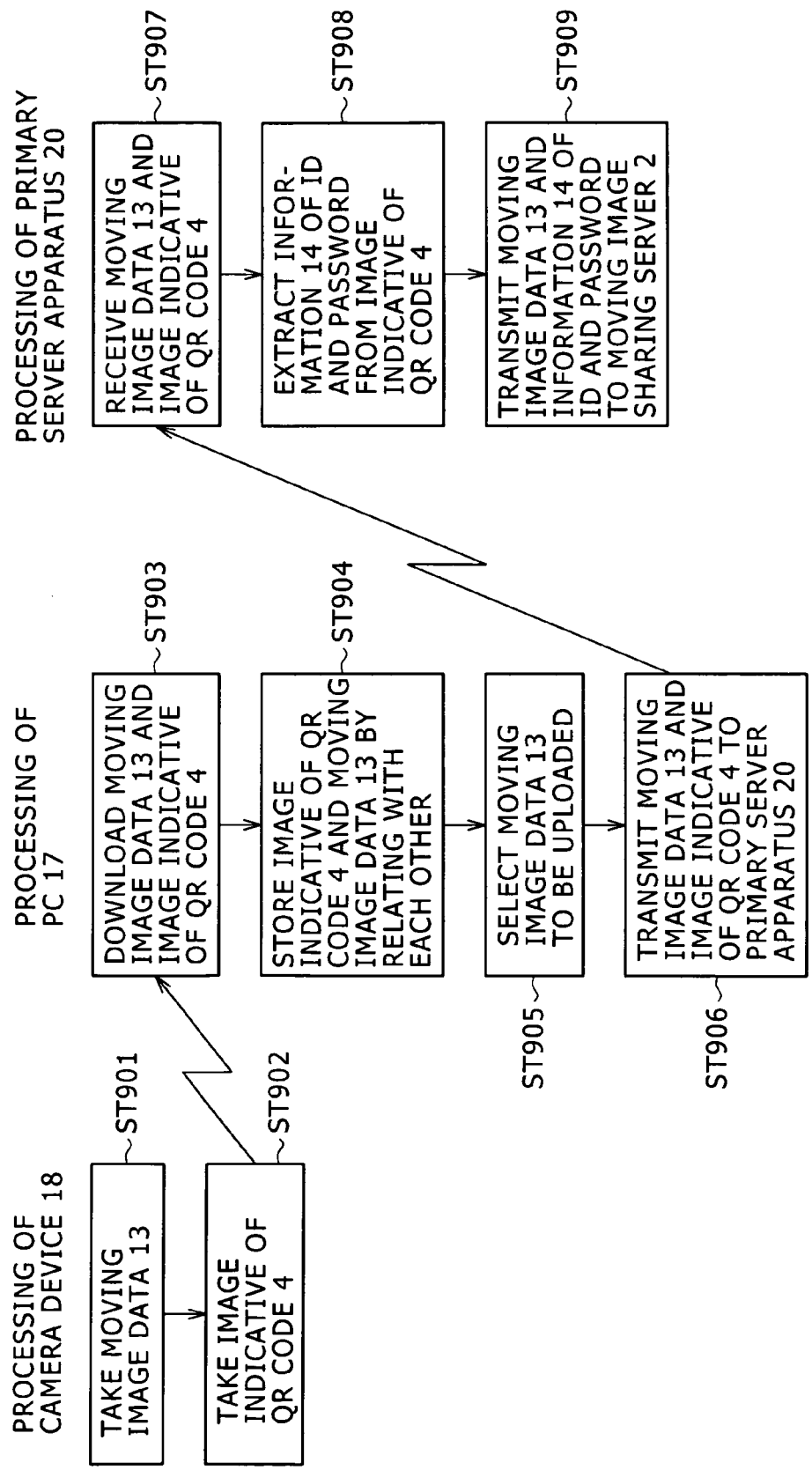
FIG. 9 is a flowchart indicative of still another embodiment of an operation for uploading content.

The following describes an operation of the upload system 300 to be executed at uploading content after membership registration. A method of membership registration may be the same as that of the foregoing embodiment. FIG. 9 shows a flowchart indicative of this operation.

Substantially same operations as those of the foregoing embodiment are executed by the mobile phone 5 and the camera device 18 (step 901 and step 902). Substantially same operations as those of the foregoing embodiment are executed by the camera device 18 and the PC 17 (step 903 and step 904). The moving image data 13 to be uploaded is selected by the user (step 905). The PC 17 transmits the selected moving image data 13 and the image indicative of the QR code 4 corresponding thereto to the primary server apparatus 20 (step 906). The primary server apparatus 20 receives the selected moving image data 13 and the image indicative of the QR code 4 corresponding thereto from the PC 17 (step 907). The primary server apparatus 20 extracts the information 14 of the ID and the password of the user from the received image indicative of the QR code 4 (step 908). The primary server apparatus 20 transmits the selected moving image data 13 and the extracted information 14 of the ID and the password to the moving image sharing server 2 (step 909).

Consequently, by transmitting the moving image data 13 and the image indicative of the QR code 4 to the primary server apparatus 20, the user can easily upload the moving image data 13 to the moving image sharing server 2 without making the PC 17 extract the above-mentioned information 14.

Figure 10:
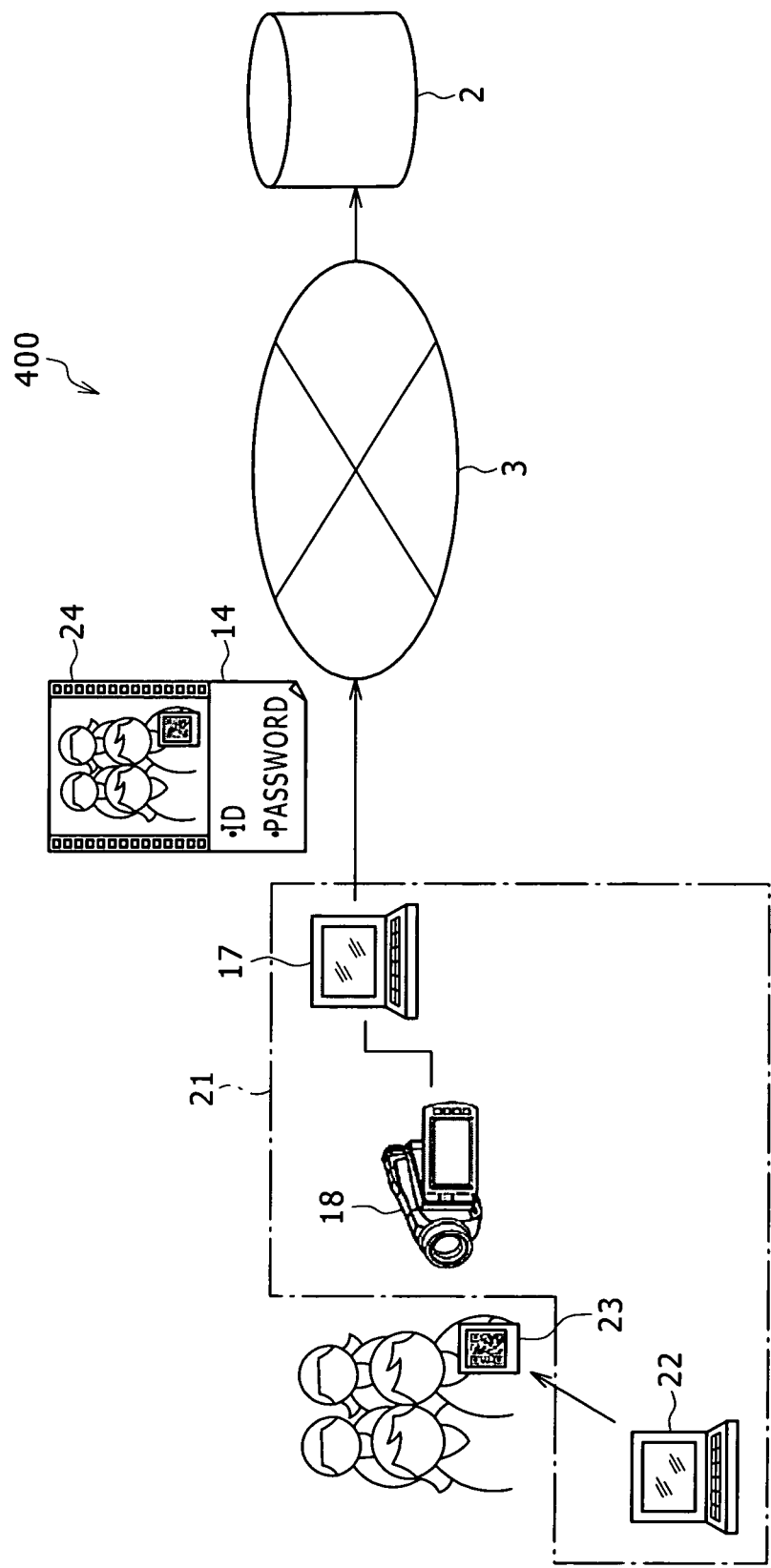
FIG. 10 is a schematic diagram illustrating a network configuration of an upload system practiced as yet another embodiment of the invention.

FIG. 10 shows a network configuration of an upload system 400 practiced as yet another embodiment of the invention. The upload system 400 includes a moving image sharing server 2 connected to a network 3 and an upload apparatus 21 connectable thereto.

The upload apparatus 21 includes a PC 22, a camera device 18, and a PC 17 as an information processing apparatus. For example, the PC 22 is connected to a printer or the like, not shown, to print an image indicative of a QR code 4 onto a print media 23.

For the print media 23, a paper media, such as a visiting card, is used but not exclusively; for example, any media may be used as long as a received image indicative of a QR code 4 is printable. For such a media, a film or the like is possible.

The following describes operations to be executed by the upload system 400 configured as described above.

Figure 11:
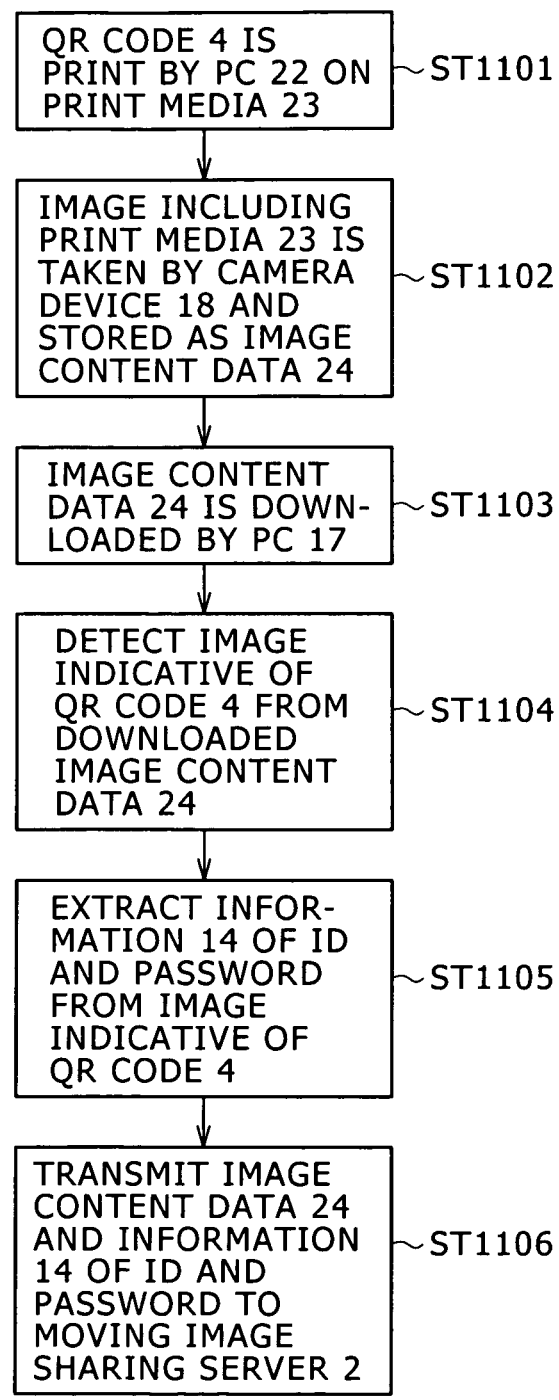
FIG. 11 is a flowchart indicative of yet another embodiment of an operation for uploading content.

The following describes an operation of the upload system 400 to be executed at uploading content after membership registration. A method of membership registration may be executed in substantially a same manner as that of the foregoing embodiment by the PC 22, for example, instead of the mobile phone 5. FIG. 11 shows a flowchart indicative of this operation.

An image indicative of a QR code 4 is printed on the print media 23 by the PC 22 and a printer, not shown (step 1101). An image including the print media 23 is taken by the camera device 18 to be stored in a storage media 10 of the camera device 18 as image content data 24 (step 1102). The above-mentioned content data 24 is downloaded by the PC 17 from the camera device 18 (step 1103). The PC 17 detects the above-mentioned printed image indicative of QR code 4 from the downloaded image content data 24 (step 1104). This detection is executed by image processing or the like. The PC 17 extracts the information 14 of the ID and the password of the user from the detected image indicative of QR code 4 (step 1105). The PC 17 transmits the above-mentioned downloaded image content data 24 and the extracted information 14 of the ID and the password to the moving image sharing server 2 (step 1106).

Consequently, by use of the camera device 18, the user can take an image including the print media 23 printed with an image indicative of QR code 4 and connect the camera device 18 with the PC 17 so as to enable the above-mentioned downloading, thereby easily uploading the image content data 24 to the moving image sharing server 2.

Also, because the image indicative of QR code 4 is printed on the print media 23, the user can take along the print media 23 and take an image thereof through the camera device 18 as required.

In addition, the PC 17 detects an image indicative of QR code 4 for each of users from images including the print media 23 corresponding to two or more users created as the image content data 24 through the camera device 18. Consequently, two or more users can take above-mentioned two or more images including the print media 23 through the camera device 18, thereby easily uploading the above-mentioned image content data 24.

It should be understood by those skilled in the art that various modifications, combinations, sub-combinations and alterations may occur depending on design requirements and other factors insofar as they are within the scope of the appended claims or the equivalents thereof.

What is claimed is:

1. An upload method comprising the steps of:
   outputting, by output means of an upload apparatus, a code image including information of an ID and a password necessary for uploading content selected by a user onto a network; and
   uploading said content selected by the user onto said network through upload means of said upload apparatus by use of the information of the ID and the password of said outputted code image,
   said code image being indicative of a barcode type image which includes the information of the ID and the password, and
   said content being related to said code image by said upload apparatus so that upon selecting said content by the user to be uploaded the information of the ID and the password included in the respective code image related thereto is provided such that a manual entry of the ID and the password by the user is unnecessary for uploading said content,
   in which, in response to a request from a user, (i) the ID and the password are generated by a server apparatus which is external to said upload apparatus, (ii) the server apparatus utilizes the generated ID and the generated password to generate said code image, (iii) and the server apparatus supplies the generated code image to said upload apparatus.

2. An upload apparatus comprising:
   an electronic device configured to output a code image including information of an ID and a password necessary for uploading content selected by a user onto a network; and
   a camera device configured to upload said content selected by the user onto said network by use of the information of the ID and the password of said code image outputted by said electronic device,
   said camera device having a transmitter,
   said code image being indicative of a barcode type image which includes the information of the ID and the password, and
   said content being related to said code image by said upload apparatus so that upon selecting said content by the user to be uploaded the information of the ID and the password included in the respective code image related thereto is provided such that a manual entry of the ID and the password by the user is unnecessary for uploading said content,
   in which, in response to a request from a user, (i) the ID and the password are generated by a server which is external to said upload apparatus, (ii) the server utilizes the generated ID and the generated password to generate said code image, (iii) and the server supplies the generated code image to said upload apparatus.

3. A server comprising:
   a receiver configured to receive content selected by a user uploaded on a network by an upload apparatus for outputting a code image including information of an ID and a password necessary for uploading said content on said network; and
   a memory configured to store said received content,
   said code image being indicative of a barcode type image which includes the information of the ID and the password, and
   said content being related to said code image by said upload apparatus so that upon selecting said content by the user to be uploaded, the information of the ID and the password included in the respective code image related thereto is provided such that a manual entry of the ID and the password by the user is unnecessary for uploading said content,
   in which, in response to a request from a the user of the upload apparatus, the server (i) generates the ID and the password, (ii) utilizes the generated ID and the generated password to generate said code image, (iii) and outputs the generated code image for supply to said upload apparatus.

4. The upload apparatus according to claim 2, wherein said camera device includes:
   a memory configured to store said content and said outputted code image by relating each other, and
   an extractor configured to extract said information of said ID and said password from said stored code image,
   said transmitter being configured to transmit said content and information of the ID and the password extracted from said code image corresponding to said content to said server on said network, said server being logged in by use of said ID and said password.

5. The upload apparatus according to claim 4, wherein said electronic device outputs said code image including said ID, said password, and address information of said server,
   said memory stores said content and said code image including said address information by relating each other,
   said extractor extracts said ID, said password, and said address information from said stored code image, and
   said transmitter transmits said content and information of an ID and a password extracted from said code image corresponding to said content to said server by use of said address information.

6. The upload apparatus according to claim 2, wherein:
   said electronic device has a display configured to display said code image; and
   said camera device is further configured to take said code image displayed on said display,
   and wherein said camera device further includes:
   a memory to store said content and said taken code image by relating each other,
   an extractor to extract said information of said ID and said password from said stored code image, and
   wherein the transmitter is configured to transmit said content and information of the ID and the password extracted from said code image corresponding to said content to said server on said network, said server being logged in by use of said ID and said password.

7. The upload apparatus according to claim 2, wherein:
said electronic device has a display configured to display said code image; and
said camera device is configured to take a code image displayed on said display, and
wherein said upload apparatus further includes a computing device configured to download said code image from said camera device to store said content and said downloaded code image by relating each other, extract said information of said ID and said password from said stored code image, and transmit said content and information of an ID and a password extracted from said code image corresponding to said content to said server on said network, said server being logged in by use of said ID and said password.

8. The upload apparatus according to claim 2, wherein:
said electronic device has a display configured to display said code image; and
said camera device is configured to take a code image displayed on said display,
wherein said upload apparatus further comprises:
 a computing device configured to download said code image from said camera device, relate said content with said downloaded code image, and transmit said content and said code image to said network, and
 a primary server configured to receive said content and said code image, extract said information of said ID and said password from said received code image, and transmit said content and information of the ID and the password extracted from said code image corresponding to said content to said server on said network, said server being logged in by use of said ID and said password.

9. The upload apparatus according to claim 2, wherein:
said electronic device prints said code image on print media; and
said camera device is configured to take an image, including said print media, to create image content data as data of said content, and
wherein said upload apparatus further comprises:
 a computing device for downloading said created image content data to detect said printed code image from said downloaded image content data, extracting said information of said ID and said password from said detected code image, and transmitting said created image content data and information of the ID and the password extracted from said code image to said server on said network, said server being logged in by use of said ID and said password.

10. The server according to claim 3, wherein
said receiver receives address information from an electronic device having said address information on said network, said electronic device being connected to said network, and
said server further has a transmitter to transmit said code image including said ID, said password, and address information of said server on said network to said electronic device corresponding to said received address information.

* * * * *